United States Patent
Endo

(10) Patent No.: US 7,203,012 B2
(45) Date of Patent: Apr. 10, 2007

(54) SIGNAL PROCESSING APPARATUS

(75) Inventor: Hiroaki Endo, Tokyo (JP)

(73) Assignee: Canon Kabushiki Kaisha (JP)

(*) Notice: Subject to any disclaimer, the term of this patent is extended or adjusted under 35 U.S.C. 154(b) by 145 days.

(21) Appl. No.: 10/841,048

(22) Filed: May 7, 2004

(65) Prior Publication Data

US 2004/0230426 A1 Nov. 18, 2004

(30) Foreign Application Priority Data

May 12, 2003 (JP) ............................. 2003-133595
Apr. 22, 2004 (JP) ............................. 2004-127174

(51) Int. Cl.
*G11B 5/02* (2006.01)
(52) U.S. Cl. ........................................................ 360/22
(58) Field of Classification Search ..................... None
See application file for complete search history.

(56) References Cited

U.S. PATENT DOCUMENTS 5,901,178 A * 5/1999 Lee et al. .................... 375/240
6,353,807 B1 * 3/2002 Tsutsui et al. ............... 704/230
6,407,972 B1 * 6/2002 Koyata et al. ................. 369/83

FOREIGN PATENT DOCUMENTS

JP 2000-175139 A 6/2000

* cited by examiner

*Primary Examiner*—Andrea Wellington
*Assistant Examiner*—Glenda P. Rodriguez
(74) *Attorney, Agent, or Firm*—Rossi, Kimms & McDowell LLP.

(57) ABSTRACT

A signal processing apparatus which is capable of reducing the occurrence of noise at editing points without the need to decode an encoded audio signal when editing the encoded audio signal. A recording/reproduction section reproduces an audio signal sequence including an audio signal encoded according to normalization information for controlling amplitude of the audio signal, and the normalization information. A normalization information converter changes the normalization information of the reproduced audio signal sequence. At least one of a first normalization information corresponding to a first encoded audio signal of a first audio signal sequence as the reproduced audio signal sequence and a second normalization information corresponding to a second encoded audio signal of a second audio signal sequence as the reproduced audio signal sequence are changed by the normalization information converter, such that the value of the first normalization information and the value of the second normalization information become equal.

5 Claims, 12 Drawing Sheets

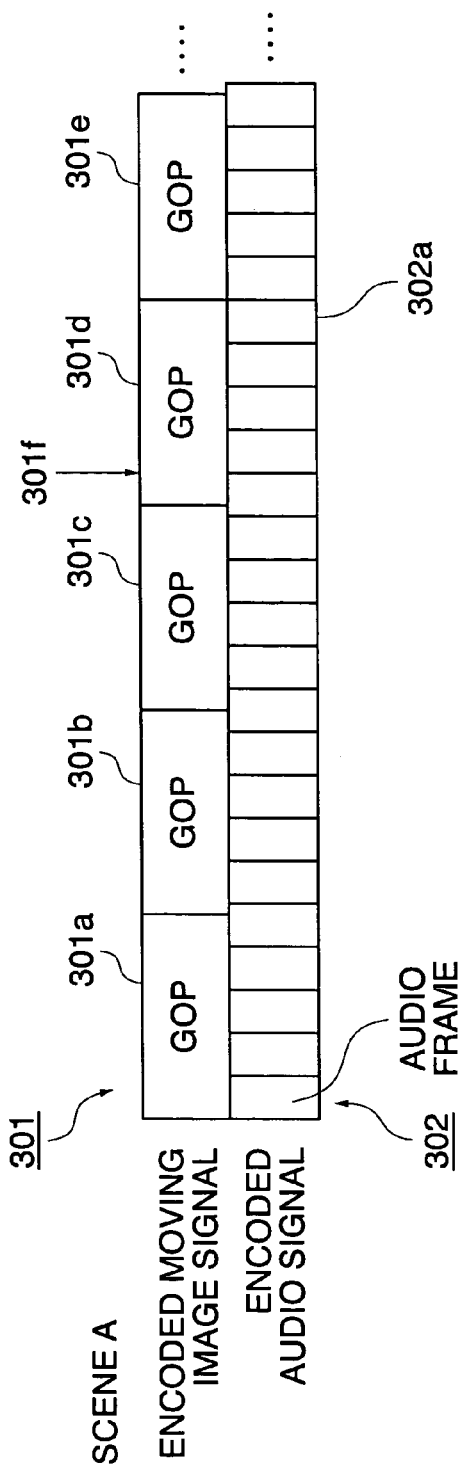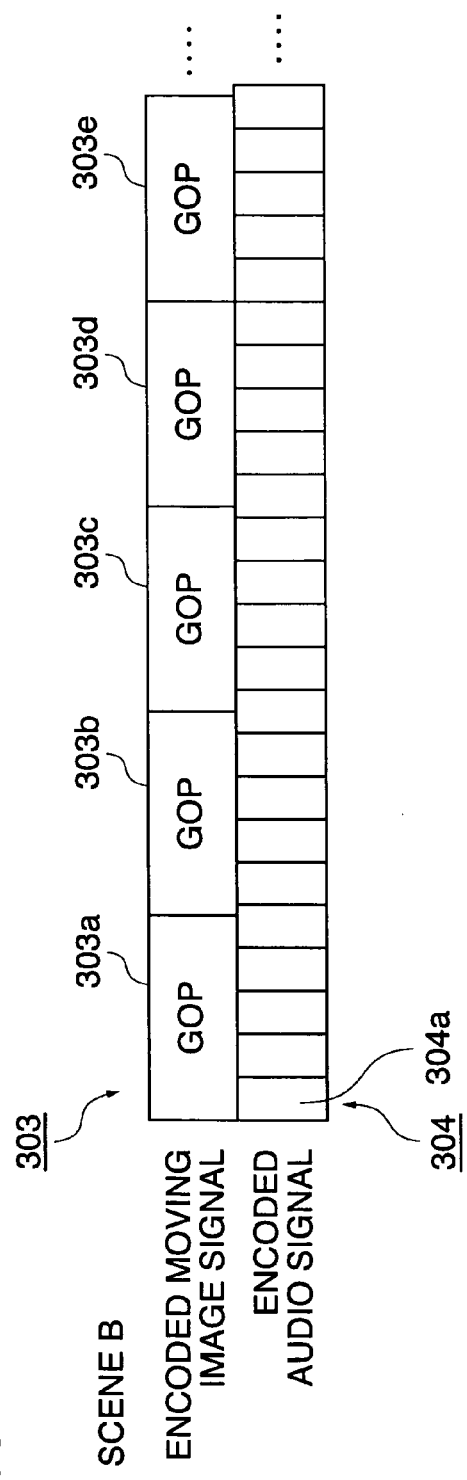

A: FIRST NORMALIZATION INFORMATION
B: SECOND NORMALIZATION INFORMATION
B': POST-TRANSFORMATION SECOND NORMALIZATION INFORMATION

A: NORMALIZATION INFORMATION BEFORE CHANGE
B: NORMALIZATION INFORMATION BEFORE CHANGE
A': NORMALIZATION INFORMATION AFTER CHANGE
B': NORMALIZATION INFORMATION AFTER CHANGE

SIGNAL PROCESSING APPARATUS

BACKGROUND OF THE INVENTION

1. Field of the Invention

The present invention relates to a signal processing apparatus, and more particularly, to a signal processing apparatus for executing processing of an encoded audio signal.

2. Description of the Related Art

Conventionally, there has been a digital video camera capable of encoding an audio signal in units of an audio frame consisting of a plurality of audio samples, and multiplexing the encoded audio signal with an encoded moving image signal and recording the multiplexed signal. In the case of a digital video camera having an editing function for editing shot scenes, editing is performed in units of moving images or in units of a group of a plurality of moving image frames (for example, Japanese Laid-Open Patent Publication (Kokai) No. 2000-175139).

However, with the prior art described above, because editing is performed based on moving image frames, usually, for an audio signal that is not synchronized with the moving image frame, it is necessary to decode the audio signal for editing, after which the audio signal is re-encoded. Moreover, with the prior art described above, in order to reduce degradation of audio quality and reduce the amount of audio signal processing, the audio signal is edited using the same audio frame units in which the audio signal is also encoded. However, because no special processing is made on the audio signal so as to control the amplitude of the audio signal, noise occurs at points of editing (a splice or joint two different scenes).

SUMMARY OF THE INVENTION

It is an object of the present invention to provide a signal processing apparatus which is capable of reducing the occurrence of noise at editing points without the need to decode an encoded audio signal when editing the encoded audio signal.

It is another object of the present invention to provide a signal processing apparatus which is capable of preventing the occurrence of noise at points where scenes are switched when continuously reproducing sounds of different scenes.

To attain the above objects, in a first aspect of the present invention, there is provided a signal processing apparatus for processing an encoded audio signal, comprising a reproducing device that reproduces an audio signal sequence including an audio signal encoded according to normalization information for controlling amplitude of the audio signal, and the normalization information, and a changing device that changes the normalization information of the audio signal sequence reproduced by the reproducing device, the changing device changes at least one of a first normalization information corresponding to a first encoded audio signal of a first audio signal sequence as the audio signal sequence reproduced by the reproducing device, and a second normalization information corresponding to a second encoded audio signal of a second audio signal sequence as the audio signal sequence reproduced by the reproducing device, such that a value of the first normalization information and a value of the second normalization information become equal.

Preferably, the signal processing apparatus further comprises a recording device that records the encoded audio signal and the normalization information on a recording medium, and a control device that controls the recording device to record the normalization information changed by the changing device on the recording medium in place of the normalization information recorded on the recording medium before being changed by the changing device.

More preferably, the recording medium is a magnetic tape, the first audio signal sequence and the second audio signal sequence being each recorded on a plurality of tracks on the magnetic tape, and the changing device comprises a memory that stores the first audio signal sequence and the second audio sequence reproduced from a predetermined number of tracks of the plurality of tracks, the changing device changing the normalization information included in at least one of the first audio signal sequence and the second audio signal sequence stored in the memory.

Still more preferably, the control device controls the recording device to read the first audio signal sequence and the second audio signal sequence for a predetermined number of tracks including the normalization information changed by the changing device from the memory and record one of the read first audio signal sequence and the second audio signal sequence on tracks corresponding to the predetermined number of tracks.

Also preferably, the first audio signal sequence and the second audio signal sequence are successively recorded on the magnetic tape in an order mentioned.

Preferably, the reproducing device reproduces the second audio signal sequence immediately after the first audio signal sequence, and the changing device changes at least one of the first normalization information immediately before a reproduction switching position at which reproduction of the first encoded audio signal is switched to reproduction of the second encoded audio signal and the second normalization information immediately after the reproduction switching position.

More preferably, the encoded audio signal is encoded in units of an audio frame consisting of a predetermined number of audio samples, and the changing device changes at least one of the normalization information of a predetermined number of audio frames immediately before the reproduction switching position and the normalization information of the predetermined number of audio frames immediately after the reproduction switching position.

Preferably, the reproducing device reproduces the second audio signal sequence immediately after the first audio signal sequence, and the changing device changes the second normalization information immediately after a reproduction switching position at which reproduction of the first encoded audio signal is switched to reproduction of the second encoded audio signal, according to the value of the first normalization information immediately before the reproduction switching position.

More preferably, the signal processing apparatus further comprises a decoding device that decodes the audio signal sequence reproduced by the reproducing device, and the decoding device decodes the second encoded audio signal reproduced immediately after the reproduction switching position according to the second normalization information changed by the changing device.

Also preferably, the signal processing apparatus further comprises a reproduction control device that controls the reproducing device to reproduce the first encoded audio signal and the second encoded audio signal in accordance with play list data indicative of a reproduction procedure of the first encoded audio signal and the second encoded audio signal.

Preferably, the changing device changes a lesser value of the value of the first normalization information and the value of the second normalization information value.

Preferably, the changing device changes both the value of the first normalization information and the value of the second normalization information to a predetermined value when the value of the first normalization information and the value of the second normalization information are both less than a predetermined value.

Also preferably the signal processing apparatus further comprises a recording device that records the encoded audio signal and the normalization information on a recording medium, and the recording device records the first audio signal sequence together with a moving image signal of a first scene and the second audio signal sequence together with a moving image signal of a second scene.

Preferably, the encoded audio signal is encoded according to the normalization information determined separately for each of a plurality of frequency bands, and the changing device changes all the normalization information for the plurality of frequency bands.

To attain the above objects, in a second aspect of the present invention, there is provide a signal processing apparatus comprising an input device that inputs audio signals, an encoding device that encodes the audio signals input by the input device according to normalization information for controlling amplitude of the audio signals, a recording device that records an audio signal sequence including the audio signals encoded by the encoding device and the normalization information on a recording medium, and a control device operable in a splicing mode in which a second audio signal input as a new audio signal by the input device is recorded on the recording medium on which a first audio signal sequence including a first audio signal encoded by the encoding device according to the normalization information and the normalization information, to control the encoding device to encode the input second audio signal according to the normalization information included in the first audio signal sequence being reproduced from a position on the recording medium immediately before a position at which recording of the second audio signal is to be started, in response to an instruction to start recording the input second audio signal.

Preferably, the control device controls the encoding device to encode the audio signal according to the normalization information having the same value as a value thereof assumed immediately before the position at which recording of the second audio signal is to be started.

Preferably, the control device controls the encoding device to encode the second audio signal according to the normalization information having the same value as a value thereof assumed immediately before the position at which recording of the second audio signal is to be started, for a predetermined period of time after recording of the second audio signal is started, and encode the second audio signal according to the normalization information arbitrarily determined after the predetermined period of time has elapsed.

Also preferably, the encoding device divides each of the input audio signals into signal components of a plurality of frequency bands, determines the normalization information independently for each of the plurality of frequency bands, and encodes the audio signals according to the determined normalization information, and the control device controls the encoding device to encode the signal components of the second audio signal of the plurality of frequency bands according to the normalization information having the same value as a value thereof assumed immediately before the position at which recording of the second audio signal is to be started.

Preferably, the recording device further records encoded moving image signals together with the audio signals, and the recording device starts to record a second one of the encoded moving image signals corresponding to the second audio signal together with the second audio signal, in timing in which an encoding unit of a first one of the moving image signals that is recorded together with the first audio signal and an encoding unit of the first audio signal coincide.

To attain the above objects, in a third aspect of the present invention, there is provided a reproducing apparatus comprising a reproducing device that reproduces a plurality of audio signal sequences including a plurality of audio signals encoded according to normalization information for controlling amplitude of each of the plurality of audio signals and the normalization information that has been used for encoding the plurality of audio signals, from a recording medium, a decoding device that decodes the audio signals of the audio signal sequence reproduced by the reproducing device, and a control device responsive to switching to a play list reproduction mode in which the plurality of audio signals are selectively reproduced through switching of the plurality of audio signals according to play list data indicative of a reproduction procedure of audio signals recorded on the recording medium, for controlling the decoding device to decode one of the plurality of audio signals that is to be reproduced immediately after the switching according to the normalization information included in one of audio signal sequences that is reproduced immediately before the switching.

Preferably, the control device controls the decoding device to decode one of the plurality of audio signals that is to be reproduced immediately after the switching according to the normalization information included in one of audio signal sequences that is reproduced immediately before the switching for a predetermined period of time after the switching of the plurality of audio signals, and decode the audio signal according to the normalization information included in the audio signal sequence that is reproduced after the switching after the predetermined period of time has elapsed.

Preferably, the encoding device encodes each of the audio signals in units of an audio frame consisting of a predetermined number of audio samples, and the control device controls the decoding device to decode a predetermined number of the audio frames immediately after the switching of the plurality of audio signals according to the normalization information of an audio frame immediately before the switching of the plurality of audio signals.

Also preferably, the encoding device encodes each of the audio signals according to the normalization information determined independently for each of the plurality of frequency bands, and the control device controls the decoding device to decode the audio signals of all of the plurality of frequency bands according to the normalization information assumed immediately before the switching of the plurality of audio signals.

The above and other objects, features and advantages of the invention will become more apparent from the following detailed description taken in conjunction with the accompanying drawings.

BRIEF DESCRIPTION OF THE DRAWINGS

FIGS. 3A and 3B are diagrams illustrating an encoded moving image signal and an encoded audio signal;

DETAILED DESCRIPTION OF THE PREFERRED EMBODIMENTS

The present invention will now be described in detail below with reference to the drawings showing preferred embodiments thereof.

Figure 1:
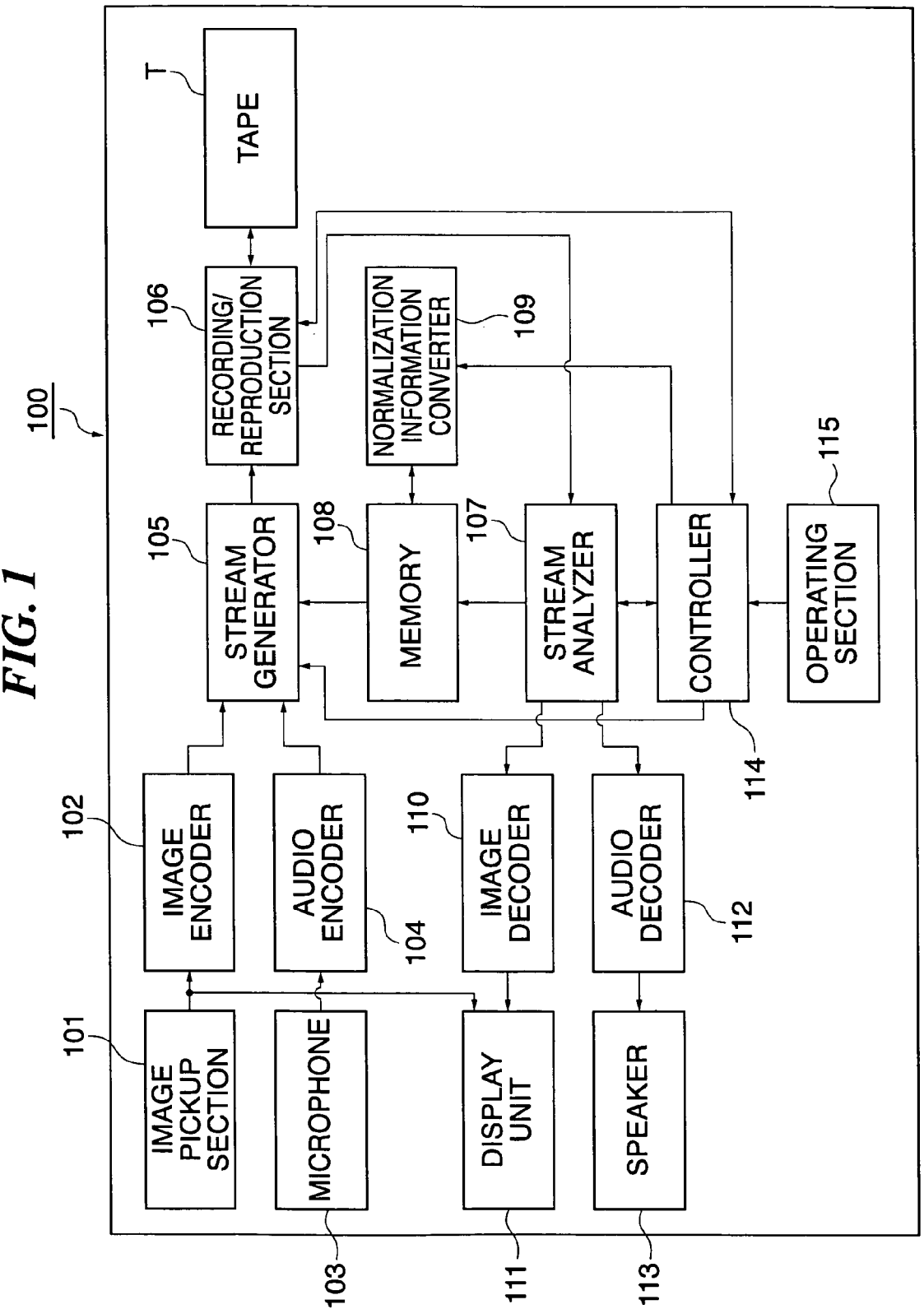
FIG. 1 is a block diagram showing the construction of a VTR comprised of a signal processing apparatus according to a first embodiment of the present invention.

FIG. 1 is a block diagram showing the construction of a digital VTR 100 comprised of a signal processing apparatus according to a first embodiment of the present invention.

In FIG. 1, the digital VTR 100 is comprised of an image pickup section 101, an image encoder 102, a microphone 103, an audio encoder 104, a stream generator 105, a recording/reproduction section 106, a stream analyzer 107, a memory 108, a normalization information converter 109, an image decoder 110, a display unit 111, an audio decoder 112, a speaker 113, a controller 114, and an operating section 115.

The digital VTR 100 encodes a shot moving image signal according to the MPEG format, encodes an audio signal obtained from the microphone 103 according to the MPEG audio format in units of audio frame, divides each of the encoded moving image signal and encoded audio signal into a predetermined number of packets, multiplexes these signals, records the multiplexed signal on a tape T, and reproduces the same.

Figure 8:
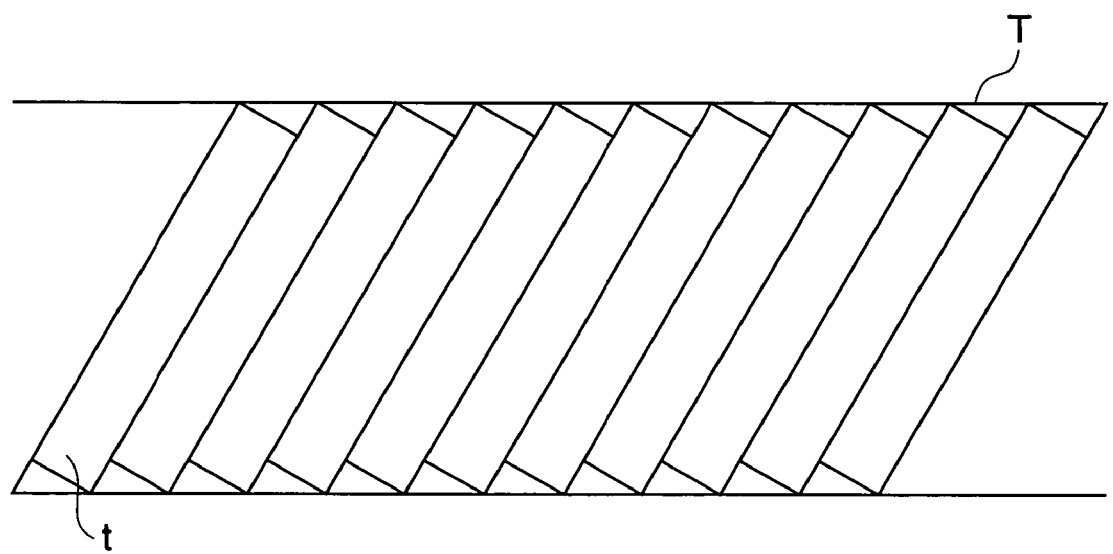
FIG. 8 is a diagram illustrating tracks on a tape.

The image pickup section 101 is comprised of an image pickup device (CCD) or the like, and outputs a moving image signal corresponding to a shot object image. The image encoder 102 encodes the moving image signal output from the image pickup section 101 according to the MPEG format. The microphone 103 outputs an audio signal corresponding to input audio. The audio encoder 104 encodes the audio signal output from the microphone 103 according to the MPEG audio format. The stream generator 105 multiplexes the encoded moving image signal output from the image encoder 102 and the encoded audio signal output from the audio encoder 104 into a multiplexed signal sequence in MPEG2-TS format or MPEG2-PS format, for example. The recording/reproduction section 106 divides the multiplexed signal sequence generated by the stream generator 105 into predetermined amounts of data or into a plurality of synchronized blocks after adding a synchronizing signal or an ID thereto, and also carries out error-correction encoding and digital modulation processing to convert the data into a format suitable for recording on the tape T. Then, a multiplicity of tracks as shown in FIG. 8 are formed on the tape T by a rotary head, not shown, and the multiplexed signal sequence is recorded on the tape T.

Moreover, the recording/reproduction section 106 reproduces the multiplexed signal sequence from the tape T and outputs the multiplexed signal sequence to the stream analyzer 107. The stream analyzer 107 carries out demodulation processing and error correction processing on the data reproduced by the recording/reproduction section 106, and detects the synchronized blocks to analyze the contents of the multiplexed signal sequence and separates the multiplexed signal sequence into the encoded moving image signal and the encoded audio signal. Then, the encoded moving image signal is output to the image decoder 110 and the encoded audio signal is output to the audio decoder 112. Moreover, the stream analyzer 107 stores the multiplexed signal sequence received from the recording/reproduction section 106 in accordance with an instruction from the controller 114, as described later. It should be noted that the memory 108 has enough capacity to store a plurality of tracks of multiplexed signal sequences. The normalization information converter 109 rewrites the normalization information of the encoded audio signal of the multiplexed signal sequence stored in the memory 108, in accordance with an instruction from the controller 114.

The image decoder 110 decodes the encoded moving image signal output from the stream analyzer 107 and outputs the decoded moving image signal to the display unit 111. The display unit 111 displays an image according to the moving image signal output from the image decoder 110 and image according to the moving image signal obtained by the image pickup section 101. The audio decoder 112 decodes the encoded audio signal output from the stream analyzer 107 and outputs the decoded audio signal to the speaker 113. The speaker 113 outputs audio corresponding to the audio signal output from the audio decoder 112.

The controller 114 controls the operations of the components of the digital VTR 100 in accordance with instructions from the operating section 115. The operating section 115 is comprised of a variety of switches operatable by a user, such as a power switch and a recording switch.

Next, a description will be given of an operation of recording a moving image signal and an audio signal with the digital VTR 100.

A moving image signal obtained by the image pickup section 101 is encoded by the image encoder 102 into the MPEG format and output to the stream generator 105. On the other hand, an audio signal output from the microphone 103 is encoded by the audio encoder 104 into the MPEG-audio format and output to the stream generator 105. Moreover, the moving image signal obtained by the image pickup section 101 is also output to the display unit 111, and in a recording pause state the image obtained by the image pickup section 101 is displayed on the display unit 111.

Figure 2:
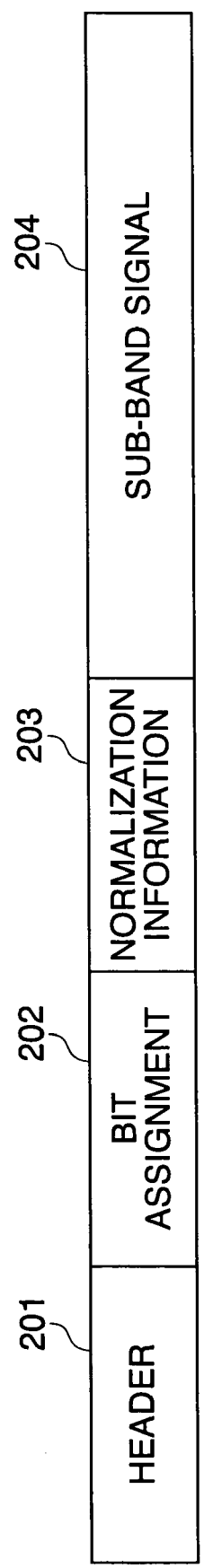
FIG. 2 is a diagram showing the structure of an encoded audio signal.

The audio encoder 104 divides an input 2-channel stereo audio signal into n, for example 32, frequency bands of signal components, and encodes the audio signal in units of an audio frame consisting of a predetermined number of audio samples for each frequency band. An example of an audio frame of a single band is shown in FIG. 2. Each audio frame includes normalization information obtained by replacing a normalization coefficient for the sub-band by a corresponding normalization information index. The normalization information is information indicative of amplitudes of samples in the frame, which have been normalized with the largest amplitude of all the samples in the frame being taken as 1, and is used to control the increase and decrease of the amplitude of the audio signal. The larger the normalization coefficient, the smaller the normalization information, and conversely, the smaller the normalization coefficient, the larger the normalization information. Thus, the normalization information corresponds to the normalization coefficient.

Moreover, the data of a single audio frame shown in FIG. 2 is comprised of a header 201, bit assignment 202, normalization information 203 and a sub-band signal 204.

When an instruction is issued to start recording from the operating section 115 in this state, the controller 114 provides control to cause the stream generator 105 to start multiplexing the encoded moving image signal and the encoded audio signal and instructs the recording/reproduction section 106 to start recording the multiplexed signal sequence output from the stream generator 105.

The stream generator 105 multiplexes the encoded moving image signal encoded by the image encoder 102 and the encoded audio signal encoded by the audio encoder 104 into a multiplexed signal sequence, and outputs the multiplexed signal sequence to the recording/reproduction section 106.

In the MPEG2 system, a format called MPEG2-TS (Transport Stream) is stipulated as a format for the multiplexed signal sequence. With MPEG2-TS, the encoded moving image signal and the encoded audio signal are each divided into packets (TS packets) consisting of a predetermined amount of data (188 byte data) and the TS packet of the moving image signal and the TS packet of the audio signal are multiplexed into a multiplexed signal sequence. A description will be given of an MPEG2-TS generated by the stream generator 105 with reference to FIG. 7.

Figure 7:
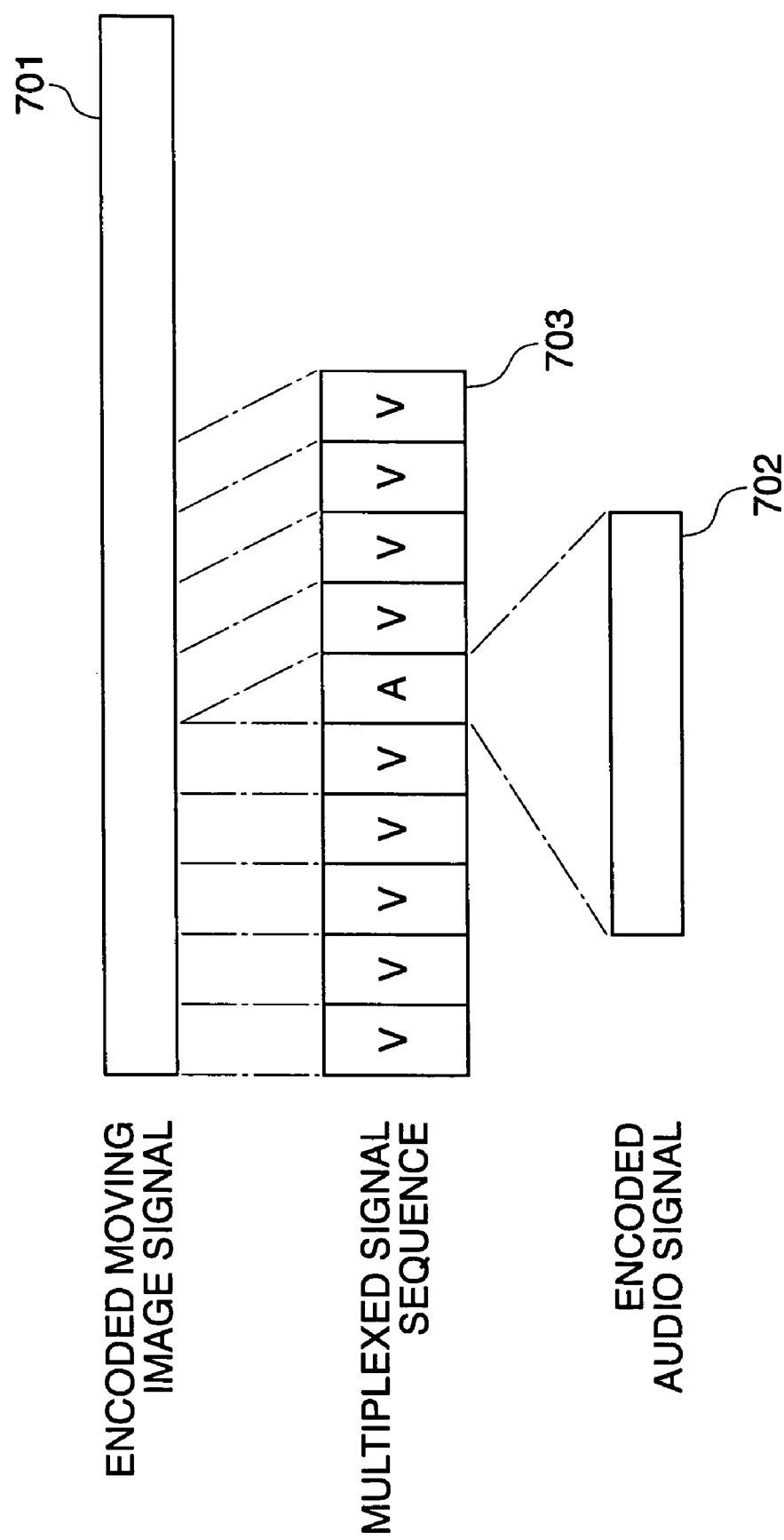
FIG. 7 is a diagram illustrating an MPEG stream.

In FIG. 7, reference numeral 701 denotes an encoded moving image signal and 702 denotes an encoded audio signal. As shown in FIG. 7, the encoded moving image signal 701 and the encoded audio signal 702 are each divided into 188 byte data as TS packets, and the moving image signal TS packet and the audio signal TS packet are multiplexed in appropriate timing to form a multiplexed signal sequence 703.

The recording/reproduction section 106 converts the multiplexed signal sequence output from the stream generator 105 into signals for recording onto the tape T, and records the signals onto the tape T. Moreover, the recording/reproduction section 106 forms a multiplicity of tracks t on the tape T with the rotary head as shown in FIG. 8 and records the multiplexed signal sequence while feeding the tape T at a predetermined speed by a mechanism, not shown.

In the present embodiment, the moving image signal and the audio signal are encoded with respective different frame periods. FIGS. 3A and 3B are diagrams illustrating the encoding periods of encoded moving image signals and encoded audio signals. With MPEG encoding, encoding is carried out in units of a group consisting of a predetermined number of frames called GOP (Group of Pictures). GOP is an encoding unit composed of a single frame of an I picture and a predetermined number of P and B pictures, and decoding can be performed in units of GOP. By contrast, the audio signal is encoded in units of an audio frame composed of a predetermined number of samples not synchronized with the GOP period of the moving image signal.

FIG. 3A shows the frame periods of an encoded moving image signal 301 and an encoded audio signal 302, of a scene A recorded on the tape T. FIG. 3B shows the frame periods of an encoded moving image signal 303 and an encoded audio signal 304 of a scene B recorded on the tape T. In FIGS. 3A and 3B, reference numeral groups 301*a*–301*e*, and 303*a*–303*e* each denote one GOP data, and in each of the signals 302 and 304, each of blocks is audio data of one frame. FIGS. 3A and 3B show examples in which the GOPs of the encoded moving image signal and the frames of the encoded audio signal coincide at every fourth GOP.

Next, a description will be given of a process for reproducing the moving image signal and audio signal recorded in the above described manner.

When an instruction is issued to reproduce from the operating section 115, the controller 114 controls the recording/reproduction section 106 to feed the tape T and reproduce the signals recorded on the multiplicity of tracks. Then, the controller 114 controls the recording/reproduction section 106 to carry out error correction and other processing on the reproduced signals and outputs the processed signals to the stream analyzer 107.

The stream analyzer 107 detects the encoded moving image signal and the encoded audio signal from the reproduced multiplexed signal sequence, and outputs the encoded moving image signal to the image decoder 110 and the encoded audio signal to the audio decoder 112. The image decoder 110 decodes the input encoded moving image signal and outputs the decoded moving image signal to the display unit 111. The display unit 111 displays a reproduction image based on the decoded moving image signal output from the image decoder 110. At the same time, the audio decoder 112 decodes the encoded audio signal and outputs the decoded audio signal to the speaker 113. The speaker 113 outputs audio reproduced based on the decoded audio signal.

Next, a description will be given of a splicing process (insert recording).

Here, the splicing means a process for recording, for example, signals of a new scene B on the tape T on which are recorded signals of the scene A as shown in FIG. 3A.

First, the user, while observing the reproduction image from the tape T, operates the operating section 115 to issue an instruction for a reproduction pause at a position at which the user wishes to start the splicing. When such a pause instruction is issued, the controller 114 instructs the recording/reproduction section 106 to temporarily stop the feeding of the tape T, receives track number information at the stop position from the stream analyzer 107, and stores the track number information in an internal register of the controller 114.

In this state, when the user issues an instruction to start recording via the operating section 115, the controller 114 instructs the recording/reproduction section 106 to start reproduction after rewinding the tape T by a predetermined amount. After reproduction starts, the controller 114 monitors the track number information output from the stream analyzer 107 and causes the stream generator 105 and the recording/reproduction section 106 to start recording an encoded moving image signal and an encoded audio signal starting with a track following a track at which the GOP period of the encoded moving image signal and the audio frame period of the encoded audio signal being reproduced coincide with each other, immediately after the tape T stop position stored as above. The controller 114 receives from the recording/reproduction section 106 the track number information on the track at which the splicing has started and stores the track number information in the internal register. Moreover, the controller 114 also receives from the recording/reproduction section 106 track number information on the track on which the first audio frame of the encoded audio signal after the start of the splicing is recorded and stores the track number information in the internal register. The information on the track at which the splicing starts and the first audio frame track number information are used in a process of changing the normalization information, described later.

For example, if the splicing starts after the instruction to pause reproduction is issued at a time point 301*f* in FIG. 3A, since the GOP period and the audio frame period coincide at the GOP data 301*d* and audio frame 302*a,* recording starts at the track following the track on which the GOP data 301*d* and the audio frame data 302*a* are recorded.

Moreover, at the header portion of signals of a newly recorded scene, for example, the scene B in FIG. 3B, the head of the GOP data 303*a* and the head of the audio frame 304*a* coincide with each other. Thereafter, recording of the new scene is continued and recording is stopped by an instruction to stop recording.

Next, a description will be given of the process for converting the normalization information before and after the spliced position (editing point) at which the encoded audio signals are subjected to the splicing as described above.

Figure 6:
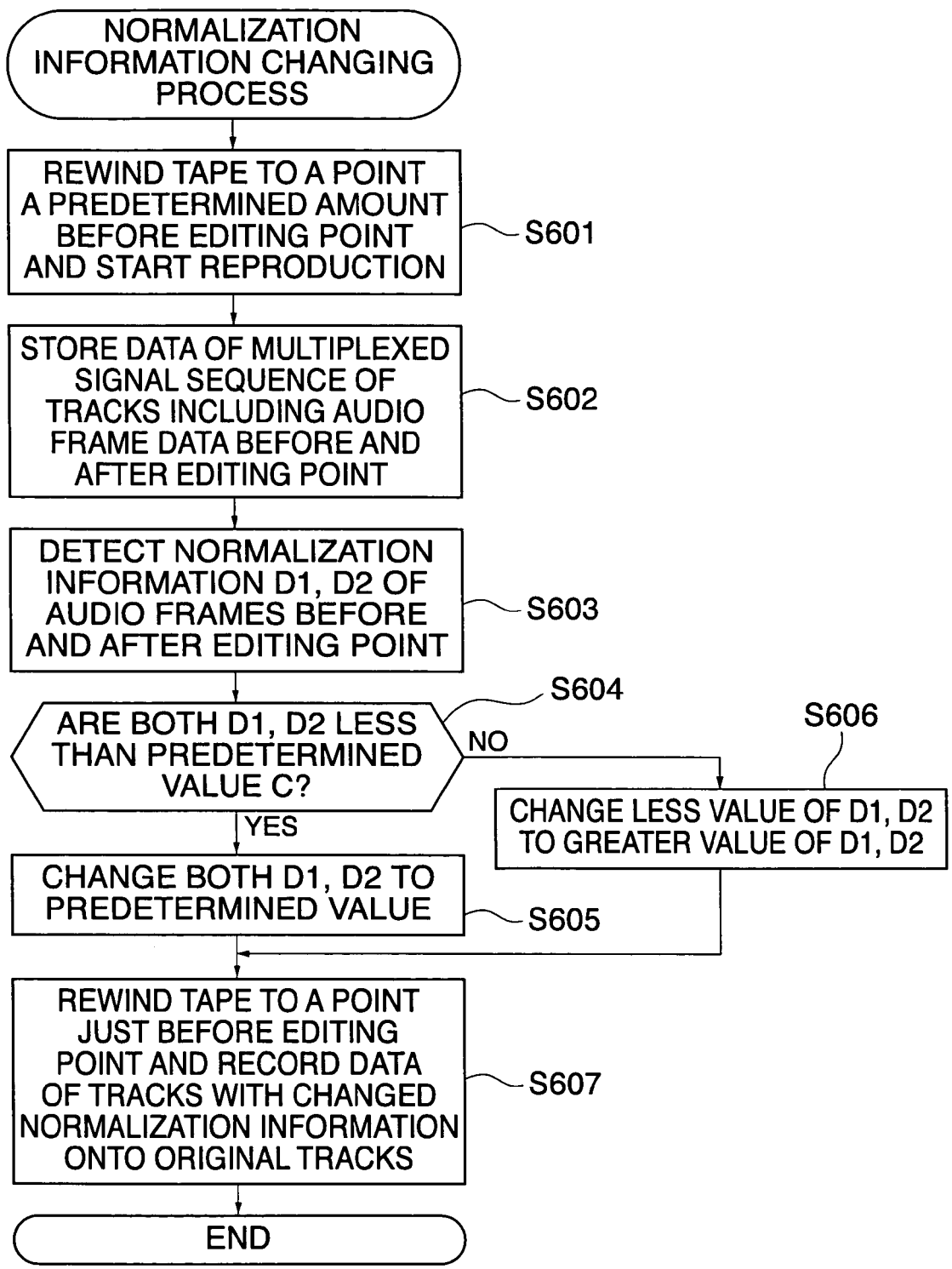
FIG. 6 is a flow chart showing a normalization information changing process.

FIG. 6 is a flow chart showing the normalization information changing process.

When the splicing is completed, the controller 114 causes the recording/reproduction section 106 to rewind the tape T to a position that is a predetermined amount prior to the track at which the splicing started (the editing point) and to start reproduction (step S601). The splicing start track information is stored in the internal register of the controller 114 when the splicing starts, as stated above.

Then, the controller 114 causes the stream analyzer 107 to output the multiplexed signal sequence reproduced from the tape T to the memory 108. The memory 108 stores a multiplexed signal sequence for a number of tracks successively output from the stream analyzer 107, for example, n tracks on which two frames of the moving image signal are to be recorded. Therefore, multiplexed signal sequence data for n tracks are always stored in the memory 108.

Then, the controller 114 monitors the track number information output from the stream analyzer 107, and upon detecting a track at which the splicing started, the controller 114 further causes the recording/reproduction section 106 to continue reproduction until data from a track on which data of the first audio frame was recorded after the start of the splicing is reproduced. Then, after completion of recording the data from the track on which the data of the first audio frame was recorded, the controller 114 causes the recording/reproduction section 106 to stop the feeding of the tape T.

As a result, all the data of the multiplexed signal sequence of the tracks on which data of audio frames immediately before and immediately after the splicing position is stored in the memory 108 (step S602).

Next, upon receiving an instruction from the controller 114, the normalization information converter 109 detects audio frame normalization information D1 and D2 of audio frames immediately before and immediately after the editing point, from the multiplexed signal sequence stored in the memory 108 (step S603). As stated before, the normalization information has a value set such that the greater the normalization coefficient, the smaller the value thereof, and conversely, the smaller the normalization coefficient, the greater the value thereof. Moreover, the normalization information converter 109 detects normalization information on all sub-bands in the audio frames immediately before and immediately after the editing point, from the normalization information D1, D2.

Then, it is determined whether or not the audio frame normalization information D1 and D2 are both less than a predetermined value C (step S604). If both the audio frame normalization information D1 and D2 are less than the predetermined value C, then the values of the normalization information on all the sub-bands in the normalization information D1 and D2 are changed to the predetermined value C (step S605).

Moreover, if the normalization information converter 109 determines that the value of either the normalization information D1 or the normalization information D2 is less than the predetermined value C (step S606), then the normalization information converter 109 compares the value of the normalization information D1 and the value of the normalization information D2 and changes the lesser value to the greater value.

It should be noted that the predetermined value C is a value experimentally determined by the present assignee.

Figure 4A:
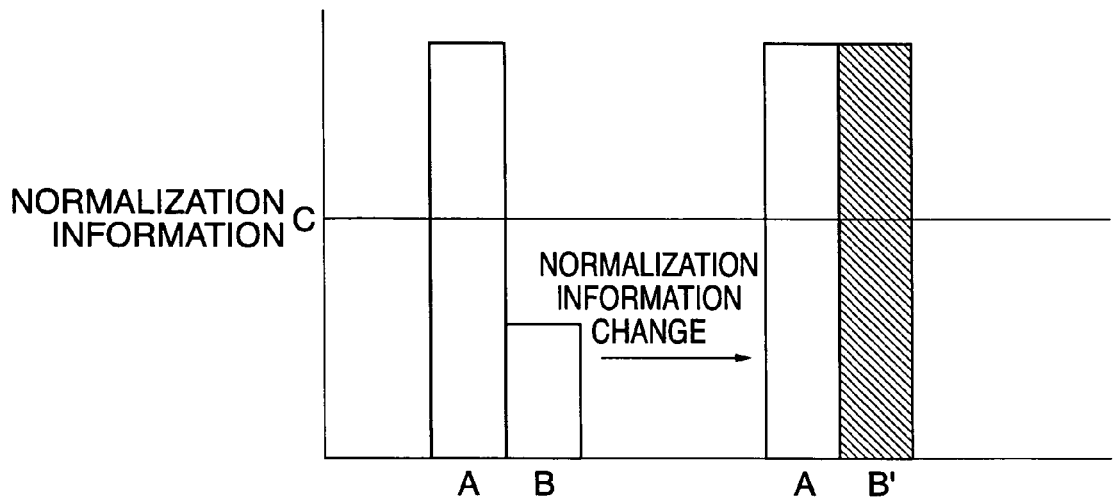
FIGS. 4A and 4B are diagrams useful in explaining a normalization information changing process.
Figure 4B:
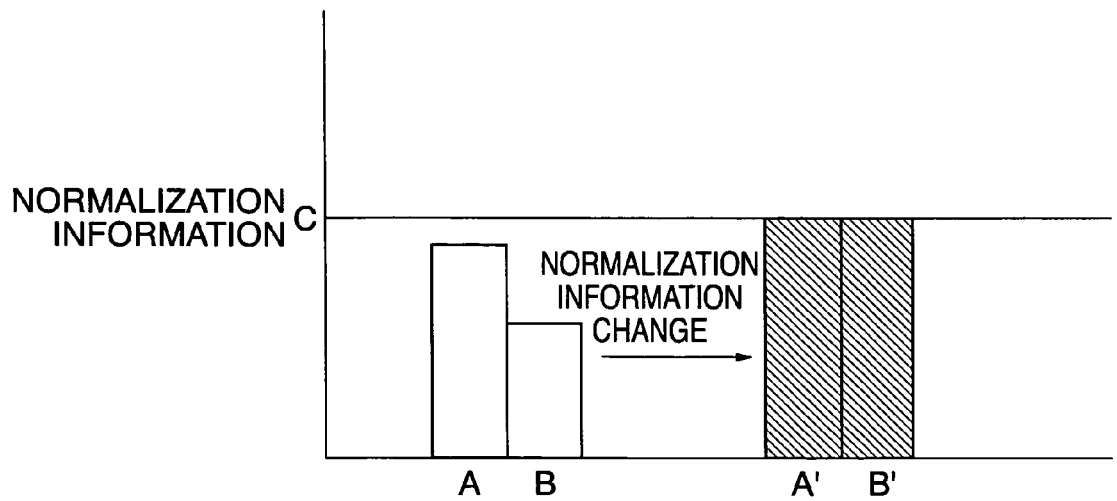

FIG. 4A is a diagram how the lesser value of either of the normalization information of the audio frames immediately before and immediately after the start of the splicing is changed to the greater value of the other normalization information. In FIG. 4A, symbol A denotes normalization information D1 before change, symbol B denotes normalization information D2 before change, and symbol B' denotes normalization information D2 after change. In FIG. 4B, symbol A denotes normalization information D1 before change, symbol B denotes normalization information D2 before change, symbol A' denotes normalization information D1 after change, and symbol B' denotes normalization information D2 after change.

After carrying out the normalization information changing process by the normalization information converter 109 as described above, the controller 114 causes the recording/reproduction section 106 to rewind the tape T to a point just before the track at which the splicing started and to start reproduction of the tape T. Then, the controller 114 causes the stream generator 105 to read n tracks of multiplexed signal sequence stored in the memory 108 after carrying out the normalization information changing process and to successively record the read multiplexed signal sequence to the original tracks of the tape T (step S607).

As described above, according to the present embodiment, the values of the normalization information for the audio frames recorded immediately before and immediately after the splicing position (the editing point) are made equal to each other, so that during reproduction the amplitude values of the audio signals before and after the splicing position can be made equal. As a result, the occurrence of noise at the spliced part can be prevented without the need to decode the audio signals before and after the splicing position, change the amplitude of the audio signals and then re-encode the audio signals as in the prior art.

Moreover, although in the present embodiment the normalization information of the pair of audio frames immediately before and immediately after the editing point is changed, alternatively, the occurrence of noise at the editing point can be reduced more effectively by continuously changing the normalization information over a continuous plurality of audio frames. A description will be made of changes in audio signals immediately before and immediately after the editing point in the case where the normalization information for a plurality of audio frames have been changed as described above with reference to FIGS. 5A to 5F.

Figure 5A:
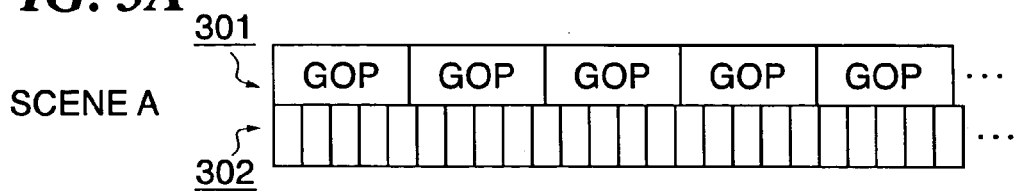
FIGS. 5A, 5B, 5C, 5D, 5E and 5F are diagrams illustrating reproduced audio signals.
Figure 5B:
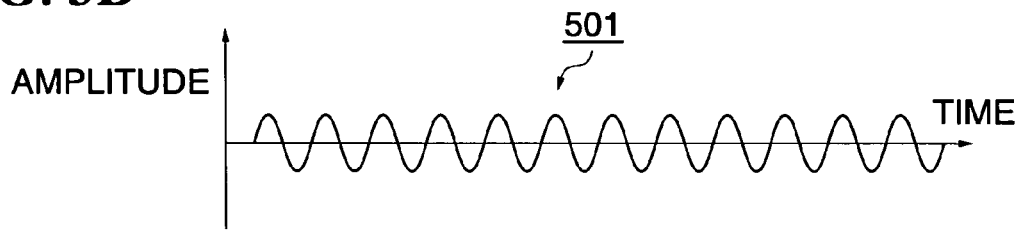
Figure 5C:
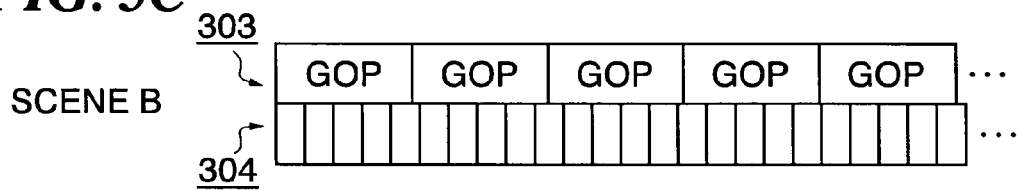
Figure 5D:
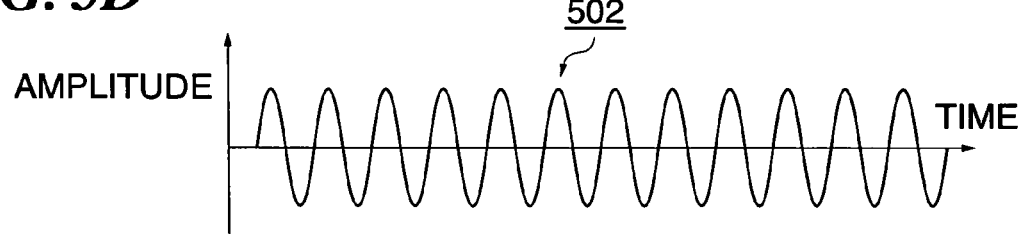
Figure 5E:
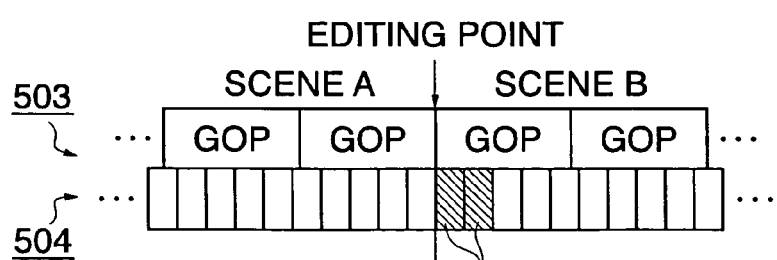
Figure 5F:
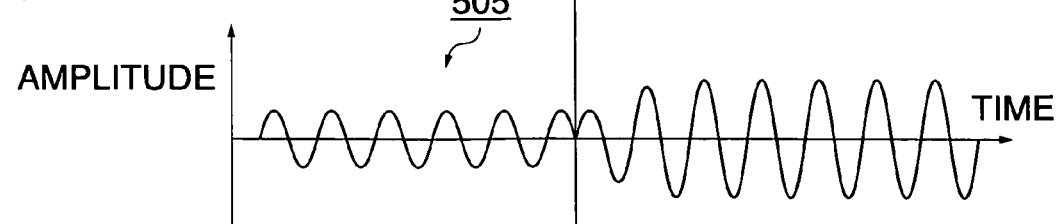

Reference numeral 501 in FIG. 5B denotes an audio signal of a scene A (in FIG. 5A) before changing of the normalization information, reference numeral 502 in FIG. 5D denotes an audio signal of a scene B (in FIG. 5C) before changing of the normalization information, and reference numeral 505 denotes an audio signal of the scene A and the scene B before and after the editing point after changing of the normalization information. Moreover, in FIGS. 5A to 5F, reference numerals 301 to 304 denote the encoded moving image signals and the encoded audio signals of the scene A and the scene B. Reference numerals 503 and 504 denote the encoded moving image signal and the encoded audio signal, respectively, after splicing.

As indicated by reference numeral 505, by changing the normalization information of the audio frame immediately after the editing point, the amplitude of the audio signals can be prevented from greatly changing before and after the editing point, whereby the occurrence of noise can be prevented.

Next, a description will be given of a second embodiment of the present invention.

Although in the first embodiment described above the values of the normalization information of the audio frames before and after the splicing position (the editing point) are changed after splicing, in the second embodiment, when carrying out the splicing, the value of the normalization information for the audio frame at a portion at which the splicing starts is determined according to the normalization information for the audio frame immediately before the start of the splicing.

Figure 9:
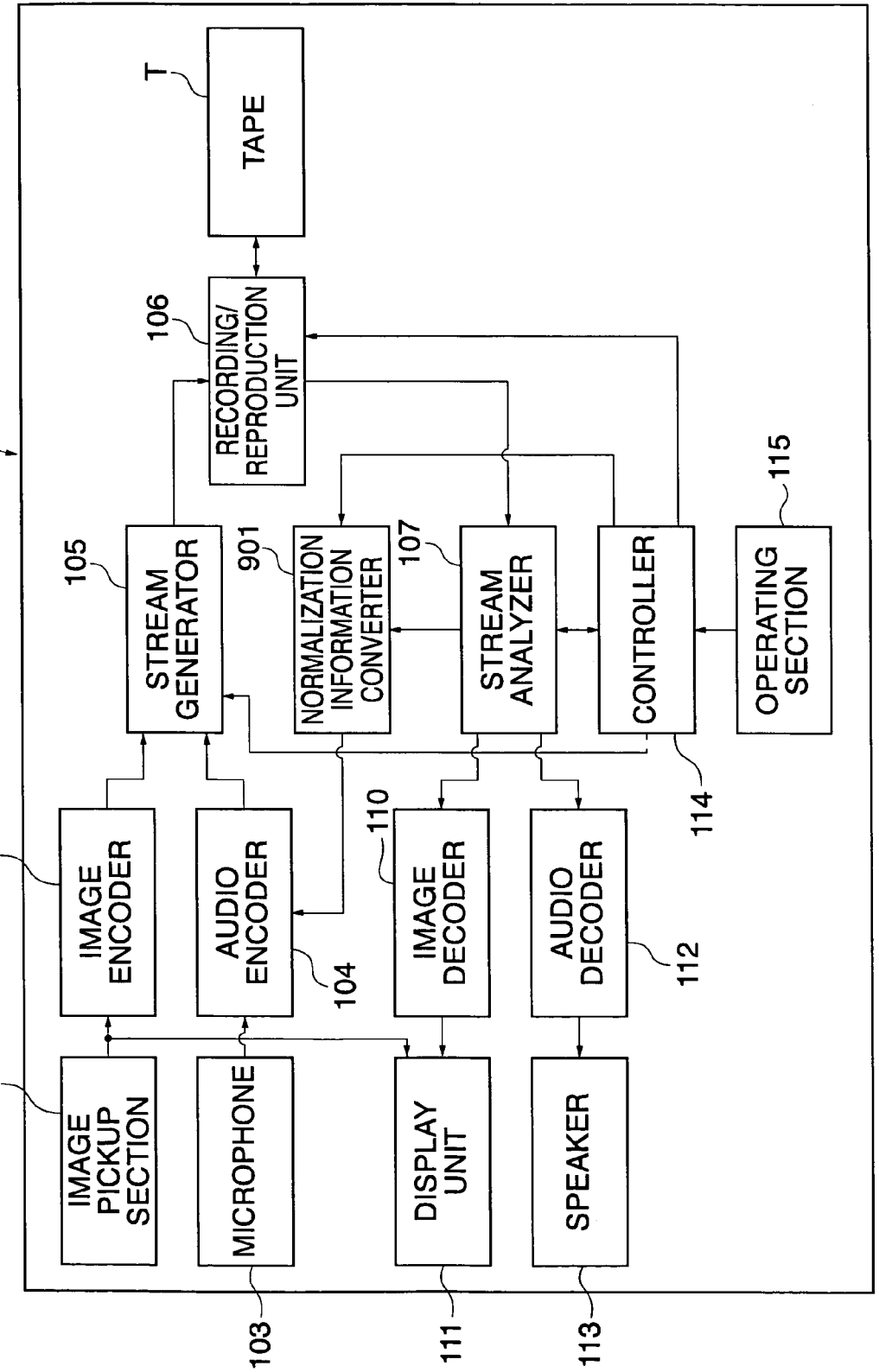
FIG. 9 is a block diagram showing the construction of a VTR comprised of a signal processing apparatus according to a second embodiment of the present invention.

FIG. 9 is a block diagram showing the construction of a digital VTR 900 comprised of a signal processing apparatus according to the second embodiment, the digital VTR 900 having essentially the same construction as that of the digital VTR 100 in FIG. 1. In FIG. 9, parts corresponding to those of the digital VTR 100 in FIG. 1 are designated by identical reference numerals and duplicate description thereof is omitted.

In the digital VTR 900 in FIG. 9, the basic recording and reproduction processes are the same as those of the digital VTR 100, and therefore duplicate description thereof is omitted. However, the present embodiment differs from the first embodiment in the splicing process.

In other words, in the present embodiment, when carrying out the splicing, the normalization information of the audio frame immediately before the splicing start position is detected, and the normalization information converter 901 is caused to encode using the audio encoder 104 based on the normalization information of the audio frame immediately before the splicing start position. A description of the splicing process according to the present embodiment will be given below.

Figure 10:
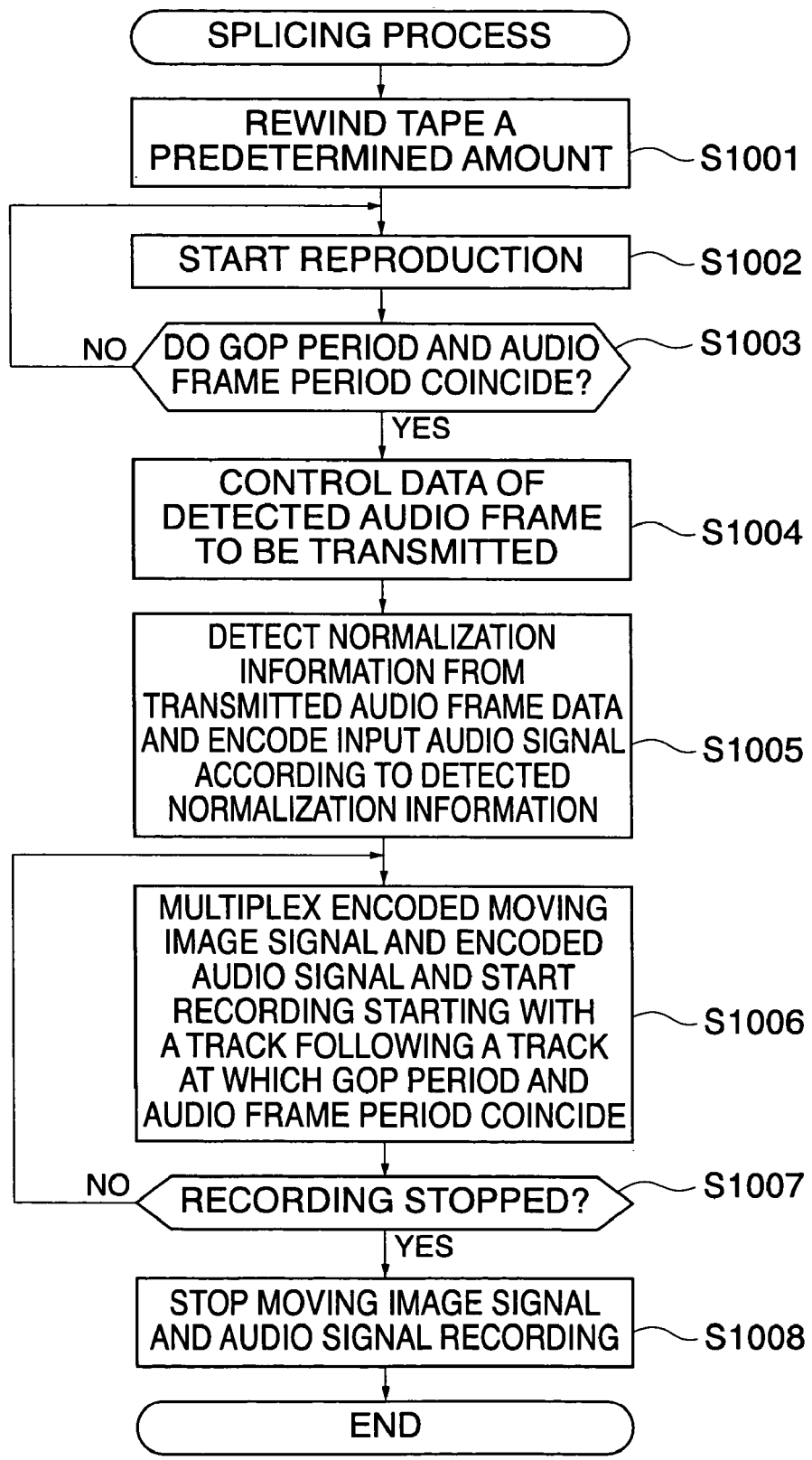
FIG. 10 is a flow chart showing a splicing process.

FIG. 10 is a flow chart showing the splicing process according to the present embodiment.

In the present embodiment as well, when carrying out the splicing, first, the user confirms the reproduction image from the tape T and operates the operating section 115 to issue an instruction to pause reproduction at a position at which the user wishes to start the splicing. Responsive to the instruction to pause, the controller 114 causes the recording/reproduction section 106 to temporarily stop the feeding of the tape T, receives information on the track number at the stop position from the stream analyzer 107 and stores the track number information in the internal register.

If in this state an instruction is given from the user via the operating section 115 to start recording, the controller 114 instructs the recording/reproduction section 106 to rewind the tape T by a predetermined amount (step S1001) and then start reproduction (step S1002). After the reproduction is started, the controller 114 monitors the track number information output from the stream analyzer 107, and immediately after the stop position of the tape T that has been stored, detects the data of the audio frame for which the GOP period of the encoded moving image signal and the audio frame period coincide with each other (step S1003) and causes the stream analyzer 107 to transmit the detected data to the normalization information converter 901 (step S1004). The audio frame data transmitted to the normalization information converter 901 at this time becomes the data of the audio frame immediately before the splicing start position.

The normalization information converter 901 operates in accordance with instructions from the controller 114 to detect the normalization information from the audio frame data transmitted from the stream analyzer 107 and cause the audio encoder 104 to encode (normalize) the audio signal over a predetermined number of audio frames using the same value as the detected normalization information (step S1005).

Then, the controller 114 causes the stream generator 105 and the recording/reproduction section 106 to start recording, starting with a track following a track at which the GOP period of the encoded moving image signal and the audio frame period of the encoded audio signal coincide with each other immediately after the tape T stop position (step S1006). The normalization information converter 901 causes the audio encoder 104 to encode using arbitrary normalization information, after encoding the audio signal of the predetermined number of audio frames after the start of the splicing.

Then, if a recording stop instruction is issued from the controller 114 due to an operation of the operating section 115 (step S1007), the recording of the moving image signal and audio signal is stopped (step S1008).

As a result of the splicing described above, the audio signal is reproduced as shown in FIGS. 5A to 5F, with no occurrence of noise before and after the splicing point.

Next, a description will be given of a third embodiment of the present invention.

In the third embodiment, the present invention is applied to a disk recorder that records a multiplexed signal sequence onto a disk medium instead of the magnetic tape T used in the foregoing embodiments.

Figure 11:
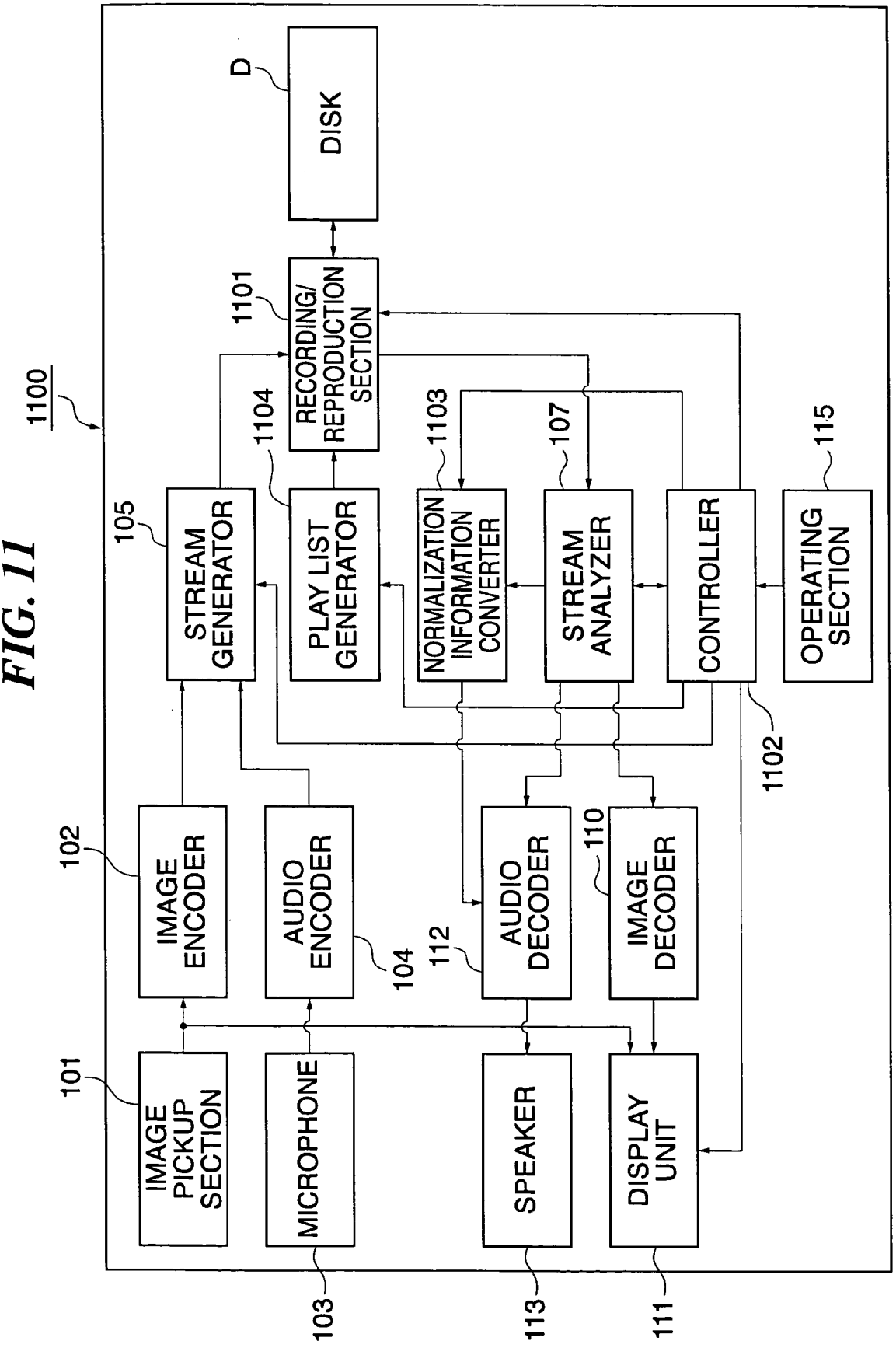
FIG. 11 is a block diagram showing the construction of a disk recorder comprised of a signal processing apparatus according to a third embodiment of the present invention.

FIG. 11 is a block diagram showing the construction of the disk recorder 1100 comprised of a signal processing apparatus according to the present embodiment. In the present embodiment as well, a moving image signal and an audio signal are encoded using the MPEG method for recording and reproduction. The image pickup section 101, image encoder 102, microphone 103, audio encoder 104 and stream generator 105 operate to encode the moving image signal and audio signal to generate a multiplexed signal sequence as is the case with the digital VTR 100 in FIG. 1. Moreover, the stream analyzer 107, image decoder 110, display unit 111, audio decoder 112, and speaker 113 also operate in the same way as with the digital VTR 100 in FIG. 1. However, in the present embodiment, the audio decoder 112 decodes the audio signal in accordance with an instruction from a normalization information converter 1103 during play list reproduction, described later.

In FIG. 11, a recording/reproduction section 1101 adds synchronization information, ID and the like to a multiplexed signal sequence output from the stream generator 105 to form synchronized blocks, performs error correction encoding or the like on the multiplexed signal sequence, and converts the multiplexed signal sequence into a recording format suitable for a disk D and records the converted multiplexed signal sequence on the disk D. In the present embodiment, a magneto-optical disk such as a DVD is used as the disk D.

Moreover, the recording/reproduction section 1101 operates in accordance with instructions from a controller 1102 to reproduce data from the disk D, detects a multiplexed signal sequence and outputs the detected multiplexed signal sequence to the stream analyzer 107. The controller 1102 controls the components of the disk recorder 1100. The normalization information converter 1103 transmits converted or changed normalization information to the audio decoder 112 to control the process for decoding the audio signal during play list reproduction. A play list generator 1104 generates play list data indicative of a reproduction procedure for image data and audio data recorded on the disk D and outputs the generated play list data to the recording/reproduction section 1101. The recording/reproduction section 1101 can also record the play list data to the disk D.

Next, a description will be given of a recording process carried out by the disk recorder 1100.

The moving image signal acquired by the image pickup section 101 is encoded according to the MPEG format by the image encoder 102 and output to the stream generator 105. The audio signal input from the microphone 103 is encoded according to the MPEG audio format by the audio encoder 104 and output to the stream generator 105. The moving image signal acquired by the image pickup section 101 is also output to the display unit 111 and the image acquired by the image pickup section 101 is displayed on the display unit 111 in a recording pause state.

If in the recording pause state an instruction to start recording is issued from the operating section 115, the controller 1102 instructs the stream generator 105 to start multiplexing the encoded moving image signal and the encoded audio signal and also instructs the recording/reproduction section 1101 to start recording the multiplexed signal sequence output from the stream generator 105.

The stream generator 105 multiplexes the moving image signal encoded by the image encoder 102 and the audio signal encoded by the audio encoder 104 and generates and outputs the multiplexed signal sequence to the recording/reproduction section 1101.

The recording/reproduction section 1101 converts the multiplexed signal sequence output from the stream generator 105 into a format suitable for recording on the disk D, and records the converted multiplexed signal sequence on the disk D. Then, when an instruction is given to stop recording, the controller 1102 instructs the recording/reproduction section 1101 to stop recording. When an instruction is given to stop recording, the recording/reproduction section 1101 is caused to record, as a single file on the disk D, a series of multiplexed signal sequences recorded on the disk D for a period of time after the instruction is given to start recording and until the instruction is given to stop recording, and then the recording/reproduction section 1101 ends the recording process.

Next, a description will be given of the process for reproducing the moving image signal and audio signal recorded as described above.

When an instruction to reproduce is given from the operating section 115, the controller 1102 causes the recording/reproduction section 1101 to reproduce the data in the designated file from the disk D. Then, the reproduced signal is subjected to error correction and other processing and the multiplexed signal sequence is detected and output to the stream analyzer 107.

The stream analyzer 107 detects the encoded moving image signal and the encoded audio signal from the reproduced multiplexed signal sequence, and outputs the encoded moving image signal to the image decoder 110 and outputs the encoded audio signal to the audio decoder 112. The image decoder 110 decodes the output encoded moving image signal and outputs the decoded moving image signal to the display unit 111. The display unit 111 displays a reproduction image based on the decoded moving image signal input from the image decoder 110. The audio decoder 112 decodes the encoded audio signal and outputs the decoded audio signal to the speaker 113. The speaker 113 outputs reproduction audio based on the input decoded audio signal.

Next, a description will be given of an editing process using the play list.

The recorder 1100 of the present embodiment has a function for editing image signals and audio signals recorded on the disk D using the play list data indicative of the procedure for reproducing the image signals and audio signals on the disk D.

When an instruction to play list edit is given from the operating section 115, the controller 1102 causes the display unit 111 to display a play list editing screen. Then, the user operates the operating section 115 while observing the editing screen to designate the reproduction procedure for image data and audio data recorded on the disk D. The controller 1102 causes the play list generator 1104 to generate play list data indicative of the designated reproduction procedure. Then, when an instruction to end play list editing is given according to an operation of the operating section 115, the play list data generated by the play list generator 1104 is output to the recording/reproduction section 1101 and recorded as a single file to the disk D.

In the way described above, according to the present embodiment, play list data indicative of the reproduction procedure is generated and the image data and audio data recorded on the disk D are reproduced according to the reproduction procedure described by the play list data, which makes it possible to realize an editing function for reproducing image data and audio data according to the procedure designated by the user, without changing the data recorded on the disk D.

By using such a play list, it is possible to continuously reproduce two scenes recorded at distant positions on the disk D.

Figure 12:
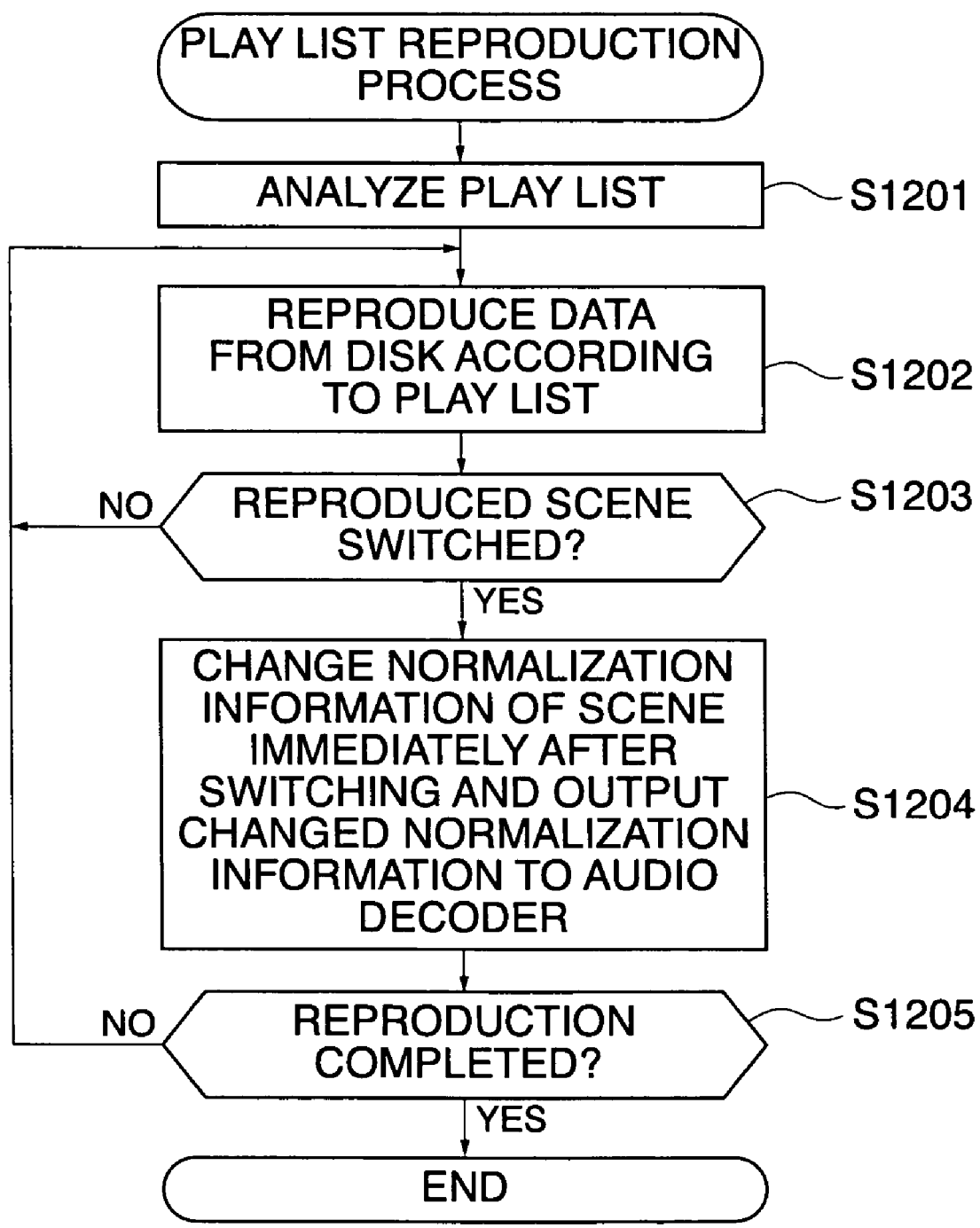
FIG. 12 is a flow chart showing a normalization information changing process in a play list reproduction mode.

Next, a description will be given of a reproduction process carried out in accordance with the play list. FIG. 12 is a flow chart showing the reproduction process carried out in accordance with the play list.

When an instruction is given to reproduce the play list from the operating section 115, the controller 1102 causes the recording/reproduction section 1101 to reproduce a file of the designated play list data. The reproduced play list data is then transmitted to the controller 1102 via the stream analyzer 107. The controller 1102 confirms the contents of the reproduced play list data (step S1201) and causes the recording/reproduction section 1101 to reproduce the image data and audio data from the disk D according to the procedure designated by the play list (step S1202).

While reproducing the image data and audio data according to the play list as described above, it is determined whether or not the reproduction position has reached a position where the reproduced scene is switched to a different scene (step S1203). If the position where the reproduced scene is switched to a different scene is reached, the controller 1102 causes the normalization information converter 1103 to change the value of the normalization information over a predetermined number of audio frames from the head of the scene immediately after switching to the same value as that of the normalization information of the last audio frame of the scene immediately before switching, and causes the normalization information converter 1103 to output the changing results to the audio decoder 112. The audio decoder 112, then operates in accordance with an instruction from the normalization information converter 1103 to decode the predetermined number of audio frames after switching of the scene according to the changed normalization information (step S1204). Thereafter, the audio decoder 112 decodes the audio signal according to the normalization information included in the reproduced encoded audio signal.

Then, when the reproduction according to the reproduction procedure designated by the play list has been completed, the reproduction process is terminated (step S1205).

As described above, according to the present embodiment, when reproducing image signals and audio signals of a plurality of different scenes according to the play list, a scene switching position is detected and the value of the normalization information of a predetermined number of audio frames after the switching is changed to the same value as that of the normalization information of the audio frame immediately before the switching. As a result, the occurrence of noise at the scene switching position can be prevented.

Although in the present embodiment a disk medium is used as the recording medium, it is also possible to use other random access media as well, such as a memory card, and still obtain the same results Moreover, although in the foregoing embodiments the present invention is applied to an apparatus that records and reproduces multiplexed signal sequences created by multiplexing encoded moving image signals and encoded audio signals, the present invention is equally applicable to an apparatus that records and reproduces only encoded audio signals.

The present invention may either be applied to a system composed of a plurality of apparatuses (e.g. a host computer, interface equipment, a reader, and a printer) or to a single apparatus (e.g. a copying machine, a facsimile machine, or the like).

It is to be understood that the object of the present invention may also be accomplished by supplying a system or an apparatus with a storage medium (or a recording medium) in which a program code of software (any of the flow charts of FIGS. 6, 10 and 12) which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the embodiments described above, and hence the program code and a storage medium in which the program code is stored constitute the present invention.

In this case, the program code may be supplied directly from a storage medium on which the program code is stored, or from a computer, database, or the like, not shown, that is connected via the Internet, a commercial network, a local area network, or the like.

The form of the program may be an object code, a program code executed by an interpreter, or script data supplied to an OS (Operating System).

Examples of the storage medium for supplying the program code include a floppy (registered trademark) disk, a hard disk, an optical disk, a magnetic-optical disk, a CD-ROM, a CD-R, a CD-RW, a DVD-ROM, a DVD-RAM, a DVD-RW, a DVD+RW, a magnetic tape, a nonvolatile memory card, and a ROM.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

What is claimed is:

1. A reproducing apparatus comprising:
a reproducing device that reproduces a plurality of image signals and a plurality of audio signal sequences corresponding to a plurality of scenes from a recording medium, the plurality of audio signal sequences including a plurality of audio signals encoded according to normalization information for controlling amplitude of each of the plurality of audio signals and the normalization information that has been used for encoding the plurality of audio signals, from a recording medium;
a decoding device that decodes the audio signals of the audio signal sequence reproduced by said reproducing device; and
a control device responsive to switching to a play list reproduction mode in which the plurality of image signals and the plurality of audio signals are selectively reproduced through switching of the plurality of image signals and the plurality of audio signals of the plurality of scenes according to play list data indicative of a reproduction procedure of the image signals and the audio signals recorded on the recording medium, for controlling said decoding device to decode one of the plurality of audio signals that is to be reproduced immediately after the switching of the scenes according to the normalization information included in one of audio signal sequences that is reproduced immediately before the switching of the scenes.

2. A reproducing apparatus according to claim 1, wherein said control device controls said decoding device to decode one of the plurality of audio signals that is to be reproduced immediately after the switching according to the normalization information included in one of audio signal sequences that is reproduced immediately before the switching for a predetermined period of time after the switching of the plurality of audio signals, and decode the audio signal according to the normalization information included in the audio signal sequence that is reproduced after the switching after the predetermined period of time has elapsed.

3. A reproducing apparatus according to claim 1, wherein:

said encoding device encodes each of the audio signals in units of an audio frame consisting of a predetermined number of audio samples; and said control device controls said decoding device to decode a predetermined number of the audio frames immediately after the switching of the plurality of audio signals according to the normalization information of an audio frame immediately before the switching of the plurality of audio signals.

4. A reproducing apparatus according to claim 1, wherein:

said encoding device encodes each of the audio signals according to the normalization information determined independently for each of the plurality of frequency bands; and said control device controls said decoding device to decode the audio signals of all of the plurality of frequency bands according to the normalization information assumed immediately before the switching of the plurality of audio signals.

5. A reproducing apparatus comprising:

a reproducing device that reproduces a plurality of image signals and a plurality of audio signal sequences corresponding to the plurality of scenes from a recording medium, the plurality of audio signal sequences including a plurality of audio signals encoded according to normalization information for controlling amplitude of each of the plurality of audio signals and the normalization information that has been used for encoding the plurality of audio signals;

a decoding device that decodes the audio signals of the audio signal sequence reproduced by said reproducing device; and a control device responsive to switching to a reproduction mode in which said reproducing device reproduces an image signal and an audio signal sequence of a second scene after an image signal and an audio signal sequence of a first scene in succession, for controlling said decoding device to decode the audio signal of the audio signal sequence of the second scene to be reproduced immediately after switching of the scenes according to the normalization information included in the audio signal sequence of the first scene that is reproduced immediately before the switching of the scenes.

* * * * *